United States Patent [19]

Ling et al.

[11] Patent Number: 4,663,055

[45] Date of Patent: May 5, 1987

[54] METHOD AND APPARATUS FOR DISTRIBUTING WATER PURIFYING CHEMICALS

[75] Inventors: Tommy Ling, Svalöv; Kjell E. Stendahl, Helsingborg, both of Sweden

[73] Assignee: Boliden Aktiebolag, Stockholm, Sweden

[21] Appl. No.: 677,871

[22] Filed: Dec. 4, 1984

[30] Foreign Application Priority Data

Dec. 8, 1983 [SE] Sweden ................................ 8306788

[51] Int. Cl.⁴ .............................................. C02F 1/52
[52] U.S. Cl. ...................... 210/738; 210/198.1; 210/219; 366/169
[58] Field of Search ............ 210/738, 198.1, 205–208, 210/219, 749; 261/89, 90; 366/169

[56] References Cited

U.S. PATENT DOCUMENTS

| | | | |
|---|---|---|---|
| 2,274,361 | 2/1942 | Darby | 366/169 |
| 2,348,123 | 5/1944 | Green et al. | 366/169 |
| 2,350,095 | 5/1944 | Carlson et al. | 210/738 |
| 2,592,709 | 4/1952 | Kinnaird | 366/169 |
| 2,685,369 | 8/1954 | Crossley | 210/738 |
| 3,482,520 | 12/1969 | Larsen | 366/169 |
| 3,666,663 | 5/1972 | Walker | 210/738 |
| 3,828,928 | 8/1974 | Hickey, Jr. | 210/219 |
| 3,882,016 | 5/1975 | Green | 210/219 |
| 3,939,073 | 2/1976 | Bats | 210/219 |
| 4,054,514 | 10/1977 | Oltmann | 210/219 |
| 4,055,494 | 10/1977 | Emmett, Jr. | 210/738 |
| 4,427,489 | 1/1984 | Jacobsen | 366/169 |

FOREIGN PATENT DOCUMENTS

| | | | |
|---|---|---|---|
| 200432 | 12/1965 | Sweden . | |
| 310651 | 5/1969 | Sweden . | |
| 1346596 | 2/1974 | United Kingdom | 210/738 |
| 1383776 | 2/1975 | United Kingdom . | |
| 0740289 | 6/1980 | U.S.S.R. | 210/219 |

OTHER PUBLICATIONS

Patent Abstract of Japan, Abstract of JP 53-21458, Feb. 27, 1978.

*Primary Examiner*—Peter Hruskoci
*Attorney, Agent, or Firm*—Brumbaugh, Graves, Donohue & Raymond

[57] ABSTRACT

A method and apparatus for distributing a water purifying chemical, particularly a flocculating-agent concentrate, throughout a stream of water to be purified. In accordance with the method, the concentrate is introduced into the stream of water transversally to its direction of flow under the action of rotational motion, to achieve a distribution time of at most one second.

8 Claims, 6 Drawing Figures

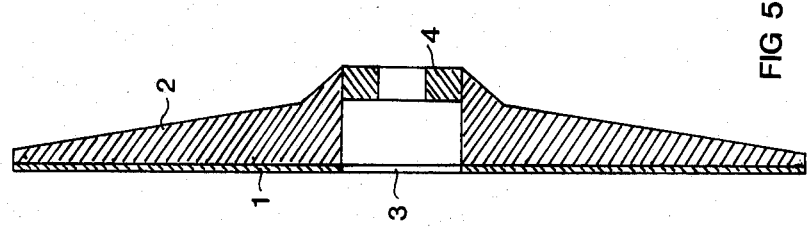
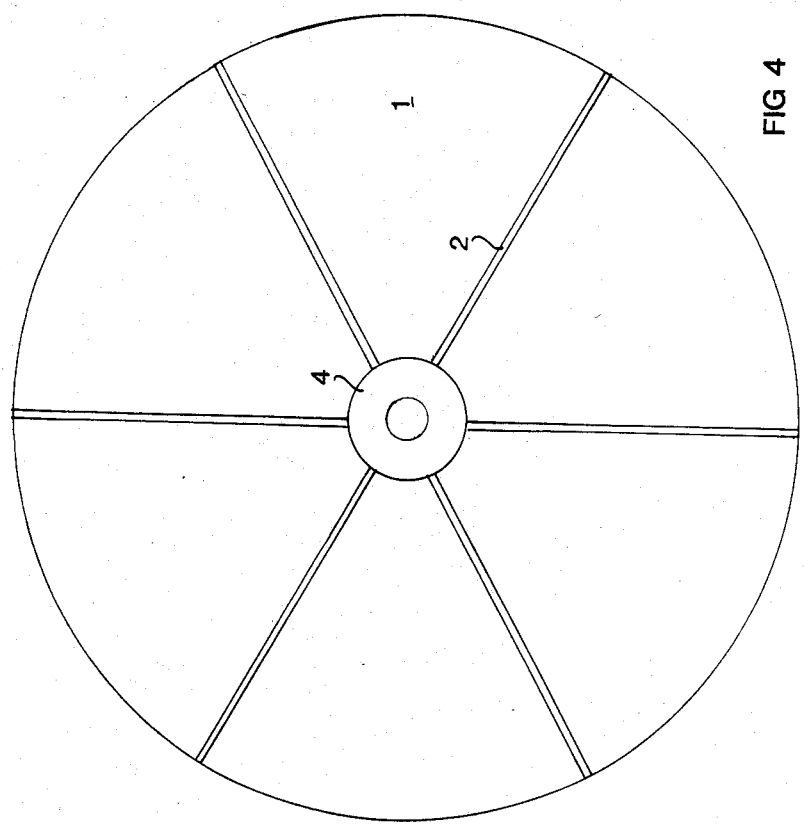

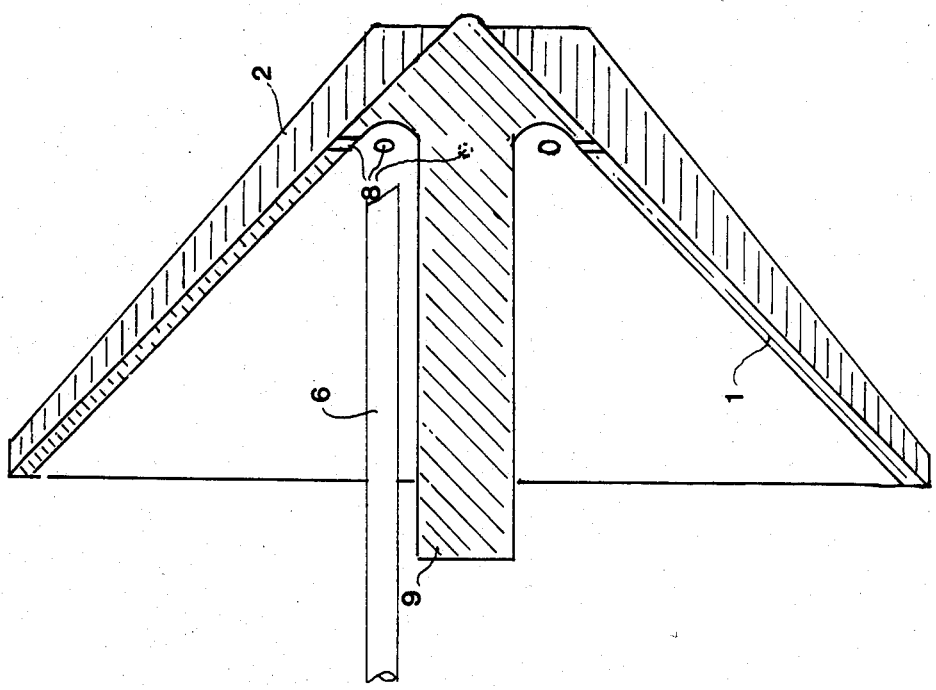

METHOD AND APPARATUS FOR DISTRIBUTING WATER PURIFYING CHEMICALS

TECHNICAL FIELD

The present invention relates generally to a method and an apparatus for distributing water purifying chemicals in water to be purified and in particular to such a method for distributing flocculating agents of aluminium sulphate, polynucleate aluminium hydroxide complexes of the sulphate and/or chloride type, iron sulphate, iron chloride or mixtures thereof; and to apparatus for carrying out the method.

The object of the present invention is to effect rapid and positive distribution of water purifying chemicals in water to be purified, in a manner to achieve a higher level of water purification and/or to reduce the quantity of water purifying chemicals required to achieve a desired pre-determined effect.

BACKGROUND ART

When cleansing water of the colloids and dissolved phosphates therein, there is used a flocculating agent, i.e. a substance which forms flocs which bind thereto and/or therein colloids and dissolved phosphates. These flocculating agents most comprise aluminium and iron salts, such as aluminium sulphate, iron sulphate, iron chloride or mixtures thereof, such as polynucleate aluminium hydroxide complexes of the sulphate or chloride type, these substances when dissolved in water forming metal hydroxide flocs, which constitute the active flocs. Such substances are used for purifying drinking water and sewage water; in this latter case, the water purifying process may also be combined with a biological purifying process. Processes which use flocculating agents are called chemical purification processes.

Normally, the flocculating agent is distributed in the input water in concentrate form, this concentrate often being prepared on site, at the respective water purifying plant, from a highly concentrate form or solid product (BOLIDEN ® ALS, BOLIDEN ® AVR). The agent is distributed by introducing the same in droplet form into a stream of ingoing water, or by introducing the flocculating agent into a large mixing vessel provided with agitating means.

The time taken for each molecule of flocculating agent to disperse in the body of water being treated is so long, however, that the precipitating effect of the agent is not utilized to the full.

It has been established that a flocculating agent passes through three phases in producing its effect. The first phase, which is referred to here as the orthokinetic phase, takes a minimum of $10^{-6}$ seconds to complete. Normally, however, this time period can extend from 30 to 60 minutes in a conventional water purification plant. There are no known methods or apparatus with which this distribution time can be shortened.

Consequently, there is a need to reduce to a minimum the time taken for a flocculating agent to be distributed throughout a body of water under treatment.

DISCLOSURE OF THE INVENTION

It has now surprisingly been found possible to greatly reduce this distribution time by means of the present invention, which is characterized by introducing a water-purifying chemical concentrate into a stream of input water substantially perpendicular to the direction of said stream under the action of a non-cavitational, rotational movement, to achieve a distribution time of at most one second.

Further characterizing features of the invention are set forth in the accompanying claims of this specification.

In addition to the aforesaid method, the invention also relates to an apparatus for carrying out the method. This apparatus will be described hereinafter in more detail with reference to the accompanying drawing, in which:

FIG. 4 is a vertical sectional view of an alternative, preferred embodiment of a distributing means according to the invention, taken through the centre of said means; and FIG. 5 is a front view of the embodiment shown in FIG. 4.

FIG. 6 is a vertical section view of another alternative preferred embodiment of a means of the invention.

Figure 1:
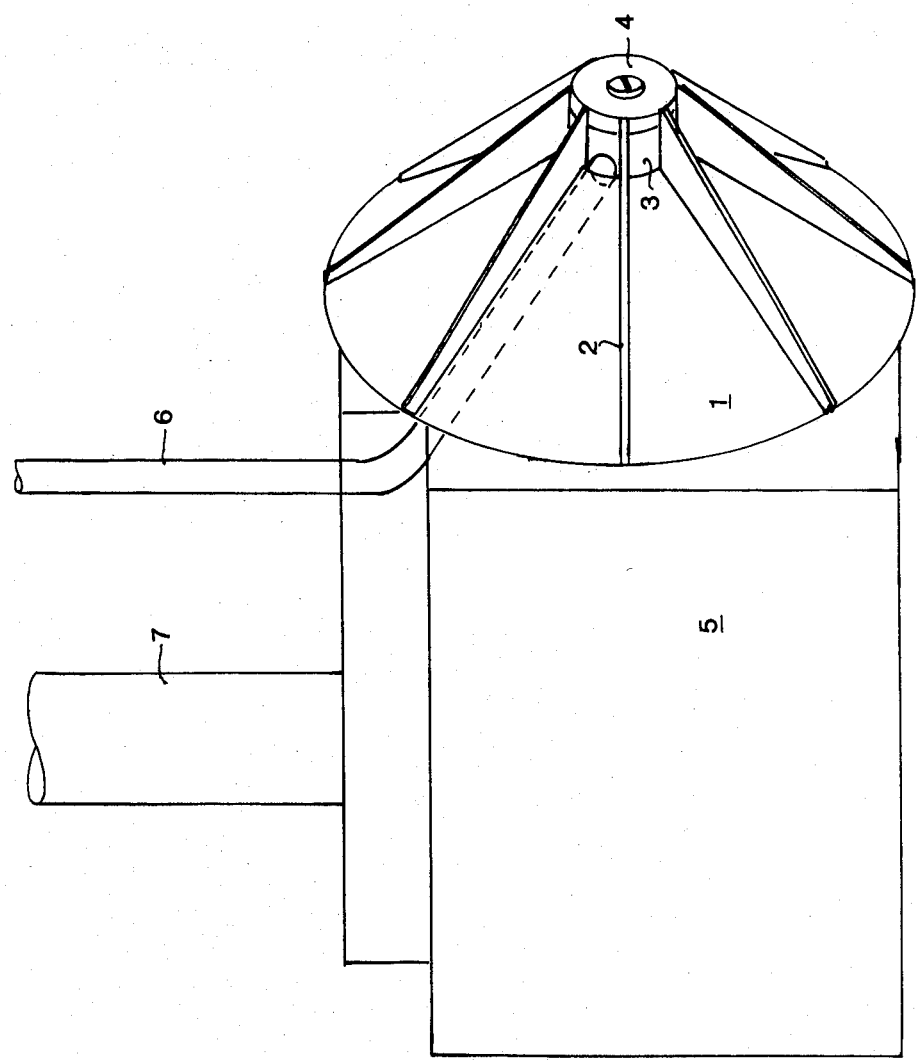
FIG. 1 illustrates in perspective a preferred embodiment of the invention.
Figure 3:
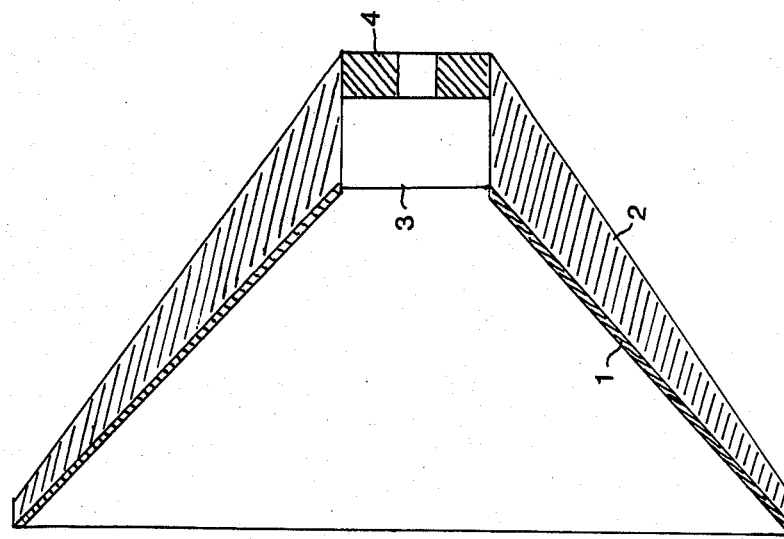
FIG. 3 is a vertical sectional view of the distributing disk shown in FIG. 1, taken through the centre of the disk.
Figure 2:
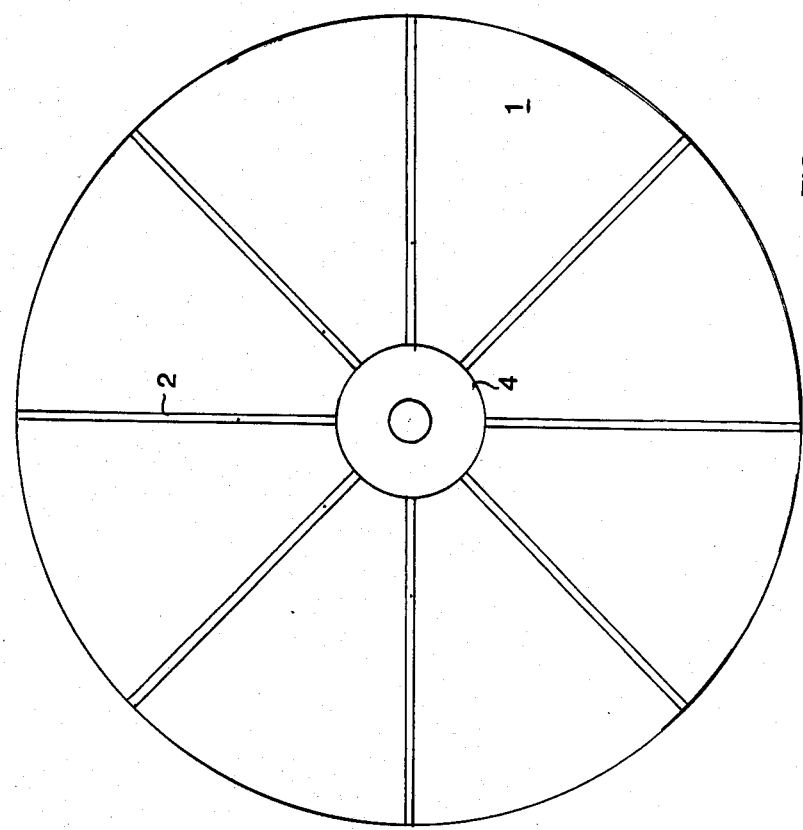
FIG. 2 is a plan view of the embodiment of FIG. 1.

FIG. 1 illustrates a circular, conical rearwardly sweeping disk 1 made of metal or composite material. The disk has arranged on the upper surface thereof a plurality (6 to 10 in number) of blades 2, which extend radially from the centre of the disk to its outer edge. The blades 2 taper downwardly towards the outer edge of the disk and have their greatest height at the centre thereof. The disk 1 is provided with a concentric centre hole 3. The blades 2 support at the centre of the disk 1 a cylindrical hub 4 which has the same diameter as the hole 3 and which is spaced slightly from the forward side of the disk 1, to form a gap between the hub and the disk. The central hub 4 is intended to be attached to the output shaft (not shown) of a motor or engine 5. The motor 5 with the disk 1 attached thereto is intended to be submerged in a stream of water under treatment, the size of the disk preferably being such that the greatest possible cross-sectional area of the stream of water is covered by the disk 1 located transversally thereto. A supply pipe 6 extends from a concentrate preparing device (not shown) to the central hole 3 of the disk 1, from the rear side of the hole. The motor is held in position in the water stream by means of a brace 7.

The apparatus according to the invention functions in the following manner.

The apparatus is submerged in a stream of water entering a sewage purification plant, with the disk facing in the direction of water flow. A flocculating-agent concentrate is pumped through the pipe 6 and out through the central hole 3 in the disk, more specifically through the gap located between the hub 4 and the central hole 3. The disk 1 is then rotated, the speed of disk rotation being selected so as to obtain maximal turbulence but to avoid cavitation adjacent the blades 2. A rotation speed of 1400 r.p.m. has been found suitable, in the case of a disk having a diameter of 25 cm. The blades 2 should not be curved, since all that is then achieved, is a pumping effect.

The embodiment illustrated in FIGS. 4 and 5 differs from that illustrated in FIG. 1 solely by the fact that the disk 1 is planar.

In FIG. 6 a vertical sectional view of another preferred embodiment of the present invention is shown. The disk 1 is circular, and conical rearwardly sweeping made of a composite material being relatively thick and having a thickness of about 5-8 mm. The disk 1 is provided with eight blades 2 extending radially and perpendicular to the disk 1 surface. The disk 1 is on its concave side, the back side in relation to its intended use and placement in a water stream, provided with a shaft joint 9 extending rearwardly from the centre. Substantially at the base of the shaft joint 9, where the back, concave surface meets with this joint 9 a number of radially extending through-going holes 8 are provided, which holes 8 connects the back and the front surfaces with each other. The wall thickness, i.e. the length of the holes 8 exceeds or is equal to the diameter of the holes 8. The holes 8 are evenly distributed around the disk 1. The holes 8 are arranged radially to the axis of the disk 1 and not radially, perpendicular to the disk surface. A conduit 6 is provided along the shaft and opens at the shaft joint in immediate vicinity of the holes 8. While rotating the disk 1 a pumping effect will be obtained by means of the holes 8 whereby the concentrate of flocculating agent will be pumped through the disk 1 and into the water passing by. In contrast to the embodiment of FIG. 1 the embodiment of FIG. 6 is not at all dependent on the water stream direction for a complete distribution of the said concentrate.

The method and apparatus according to the invention were tested in series of identical precipitation tanks forming part of a biological purification plant. Three tanks were used, and to each tank there was supplied 3000-4000 $m^3$ of water sewage each 24 hours. No flocculating agent was introduced into tank I, this tank functioning purely and simply as a reference tank. A concentrate of Boliden ® AVR ($Al_2(SO_4)_3$; $Fe_2(SO_4)_3$; 13.5% $Al_2O_3$, 45% $Fe_2O_3$) was added dropwise to tank II in an amount of 147 mg per $m^3$. The same amount of BOLIDEN ® AVR, i.e. 148 mg per $m^3$, was also added to tank III, this tank having an apparatus according to the invention placed in the path of incoming water. The ingoing sewage water had a phosphorous content of about 20 mg/$m^3$. The reduction in phosphorous content between tank I and tank II was 37%, this being the mean value over a period of 14 days, and the reduction in COD was 18%. The mean value of phosphorous reduction between tank II and III over a period of 14 days was 73%, and the reduction in COD was 42%.

As will be seen when applying the method and apparatus according to the invention, an improvement over standard procedures (tank II) of approximately 100% is achieved. Subsequent to the tests, tank III had a water transparency of about 50 cm, while the water transparency of the remaining tanks was zero.

The BOLIDEN ® AVR concentrate was 10% with respect to solid BOLIDEN ® AVR.

We claim:

1. In a method for purifying water wherein a water purifying chemical is mixed with a stream of water to be purified, the improvement comprising:
   (a) positioning a rotable disk perpendicular to said stream, said disk being rotatable about a central hub and having a front face disposed to intercept said stream, a second face disposed away from said stream, a plurality of radially extending blades attached to said front face and extending from said central hub to the outer edge of said disk, said blades having their greatest height in the center of said disk and tapering downwardly toward the outer edge of said disk, one or more openings connecting said front face with said second face in the vicinity of said hub, means for supplying said chemical to said one or more openings in the vicinity of said hub, and means for rotating said disk; and
   (b) supplying said chemical to said one or more openings in the vicinity of the hub, while rotating said disk at a rate, not exceeding the rate at which cavitation will occur, effective to pump said chemical through said one or more openings in order to blend said chemical with said stream as it is intercepted by the front face in less than one second.

2. A method according to claim 1, wherein said openings include radially directed throughgoing holes connecting said front and said second faces, wherein the plurality of radially extending blades distribute the chemical throughout said passing stream of water, when said chemical passes through said holes.

3. An apparatus for purifying water in a process where a water purifying chemical is mixed with a stream of water to be purified, comprising a rotatable disk which is rotatable about a central hub, means for positioning said disk perpendicular to said stream, said disk having a front face and a second face disposed to intercept said stream, disposed away from said stream a plurality of radially extending blades attached to said front face and extending from said central hub to the outer edge of said disk, said blades having their greatest height in the center of said disk and tapering downwardly toward the outer edge of said disk, one or more openings connecting said front face with said second face in the vicinity of said hub, means for supplying said chemical to said one or more openings in the vicinity of said hub, and means for rotating said rotatable disk, wherein said rotatable disk can be rotated at a rate, not exceeding the rate at which cavitation will occur, effective to pump a chemical supplied in the vicinity of the central hub through said one or more openings in order to blend said chemical with a stream as it is intercepted by the front face in less than one second.

4. An apparatus according to claim 3, wherein said rotatable disk has a planar circular configuration.

5. An apparatus according to claim 3, wherein said rotatable disk has a circular conical configuration.

6. An apparatus according to any of claims 3, 4 or 5, wherein said rotatable disk has a certain thickness and said openings include radially directed through-going holes.

7. An apparatus according to claim 6, wherein said through-going holes have a diameter equal to or smaller than the thickness of said rotatable disk.

8. An apparatus according to claim 6, wherein said through-going holes are evenly distributed around said disk rotatable disk at equal distances from the center of said rotatable disk.

* * * * *